Aug. 11, 1970  S. A. NILSSON  3,523,348
HOLDER FOR MACHINE TOOLS OF FLEXIBLE MATERIAL HAVING
TEETH OR A CUTTING EDGE
Filed April 2, 1969

INVENTOR
SVEN ARVID NILSSON
By Holman, Glascock, Downing
& Seebold
ATTORNEYS

United States Patent Office 3,523,348
Patented Aug. 11, 1970

3,523,348
HOLDER FOR MACHINE TOOLS OF FLEXIBLE MATERIAL HAVING TEETH OR A CUTTING EDGE
Sven Arvid Nilsson, Eskilstuna, Sweden, assignor to C. O. Oberg & Co:s AB, Eskilstuna, Sweden, a joint-stock company of Sweden
Filed Apr. 2, 1969, Ser. No. 812,660
Claims priority, application Sweden, Apr. 9, 1968, 4,767/68
Int. Cl. B23d 71/00, 71/04
U.S. Cl. 29—78                                  5 Claims

ABSTRACT OF THE DISCLOSURE

A holder for flexible machine tools having a cutting edge in which the tool is pivotally attached at one end of a U-shaped bar for movement about an axis perpendicular to the bar and at its other end for longitudinal movement as well as pivotal movement about an axis perpendicular to the bar. Adjustment means for the bar coacts with the reverse side of the tool for effecting an adjustment of the tool's convexity.

BACKGROUND OF THE INVENTION

The present invention relates to a holder for machine tools of flexible material having teeth or a cutting edge for use when machining large surfaces. The tool is of sheet-metal, steel or some other material, depending on the material of the workpiece to be machined. It is thus desirable for the tool to be given a shape which is adapted according to the nature and shape of the surface.

The object of the invention is to produce a holder for the purpose in question, which is light weight and can which easily be adapted according to differing surfaces of the workpiece. Previously known tools have not fulfilled this requirement.

SUMMARY OF THE INVENTION

According to the invention, the purpose is achieved since the holder includes a light, rigid bar, preferably U-shaped, provided with at least one handle and with means for attaching the tool to the ends of the bar, with one of the attachment means being pivotable about an axis perpendicular to the bar and the other attachment means being movable longitudinally along the bar and also pivotable about an axis perpendicular to the bar, an adjustment means for the bar which rests on the reverse side of the tool for enabling a relative adjustment of the convexity of the tool in relation to the bar. The second attachment means suitably consists of a block having an elongated hole for the axis, with the hole being transverse to the bar.

In its simplest form, the adjustment means consists of a screw provided with a manipulating head, with the screw being threaded into a nut attached to the bar and resting against a spring which presses against the reverse side of the tool. This spring may possibly be of such length as to extend along the entire length of the tool and may be attached at the attachment means. However, the spring may also be shaped so that it presses against the tool at two separate points spaced in the longitudinal direction.

In certain cases it may be desirable for the holder to be provided with two or more adjustment means of the type described.

Further objects and advantages of the invention will become more readily apparent to persons skilled in the art from the following detailed specifications and annexed drawings, and in which drawings:

Figure 1:
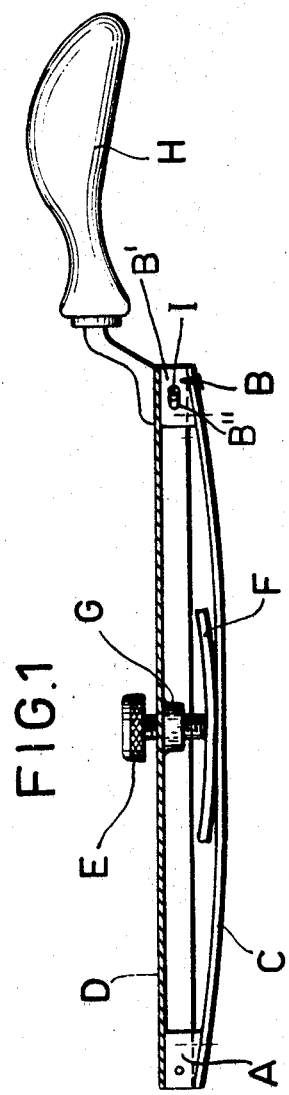
FIG. 1 is a view partly in side elevation and partly in cross-section of a holder embodying the invention.

According to FIG. 1 the holder consists of a U-shaped bar D provided with one handle H at one end thereof. At the front and rear ends of the bar are attachment means A and B for a machine tool C having a cutting edge or teeth, with the tool being of some suitable material. One end of the tool is attached, for example, with screws, to the attachment means A, which is stationary in relation to the D. At the other attachment means B, the tool is secured in a block B', for example, via screws. The block is provided with an elongated hole B'' through which a shaft or pin 1, transverse in relation to the bar, passes and is attached to the bar. The tool thus has a certain freedom of movement in the longitudinal direction of the bar and its convexity with respect to the bar can thus be varied.

Figure 2:
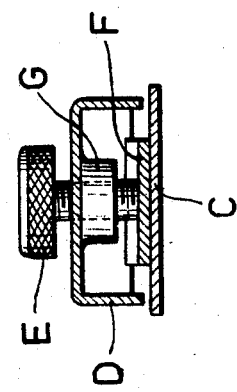
FIG. 2 is a view partly in end elevation and partly in cross-section of the holder illustrated in FIG. 1, the view being on an enlarged scale.

This convexity is regulated by an adjustment means which, in accordance with FIGS. 1 and 2, consist of a screw having a knurled manipulating head E, and the screw cooperating with a nut G attached to the inside of the bar. The end of the screw rests against a spring F extending along the reverse or inner side of the tool C. By adjusting the screw, the spring can be caused to press with varying strength against the tool so that the convexity thereof in relation to the bar D can be altered as desired.

Figure 3:
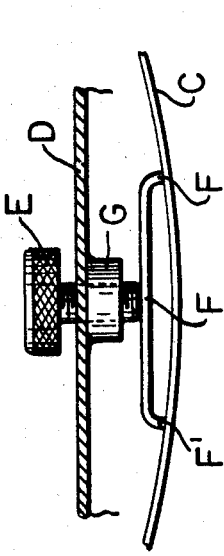
FIG. 3 is a fragmentary view partly in side elevation and partly in cross-section of a modified embodiment of the invention.

FIG. 3 shows schematically that ends F' of the spring F are shaped so that such end press against the tool at two different points spaced longitudinally thereof, which may be desirable if the length and stiffness of the tool makes it possible.

Figure 4:
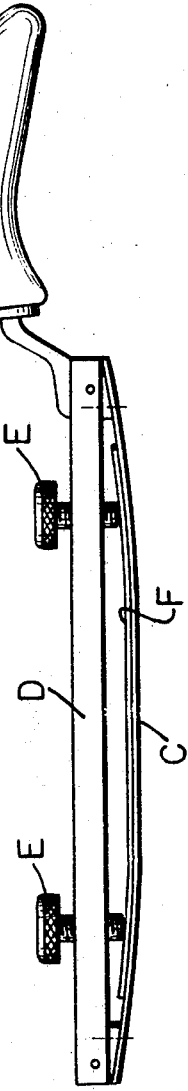
FIG. 4 is a view in side elevation of a further embodiment of the invention.

FIG. 4 shows schematically that the holder may be provided with two adjustment means similar to that illustrated in FIG. 1 with the adjustment means being spaced longitudinally of the bar. This embodiment increases the possibility of adjustment.

Within the scope of the invention the spring and adjustment means may also be shaped differently from that disclosed and the holder may be provided with handles positioned other than in the manner shown in the drawing.

The invention provides a holder which, in relation to known holders, has a considerably lighter construction and greatly improved adjustment possibilities.

What I claim is:
1. A holder for a flexible machine tool having an active surface provided with teeth or a cutting edge and an inactive surface, comprising a light, rigid bar of U-shape in cross-section, handle defining means for one end of the bar, first attachment means for one end of said tool mounted between the legs of the bar adjacent one end thereof for pivotal movement about an axis perpendicular to the bar, second attachment means for the opposite end of the tool mounted between the legs of said bar adjacent the other end of said bar for longitudinal movement along the bar and for pivotal movement about an axis perpendicular to the bar, and adjustment means carried by the bar intermediate the ends thereof for coaction with the inactive surface of the tool whereby manipulation of the adjustment means effects a relative adjustment of the convexity of the tool with respect to the bar.

2. The holder as claimed in claim 1 in which said second attachment means includes a block having an elongated hole therein, said hole being transverse with respect to the bar and a pin located in said hole.

3. The holder as claimed in claim 1 in which said adjustment means includes at least one screw member, a manipulating head for said screw member located exteriorly of said bar, nut means attached to said bar in which said screw is threaded, a spring located between the adjusting means and the inactive surface of the tool against which the free end of said screw rests.

4. The holder as claimed in claim 3 in which said spring is provided with end portions adapted to press against the inactive surface of said tool at two separate locations spaced longitudinally of said tool.

5. The holder as claimed in claim 1 including two longitudinally spaced adjustment means carried by said bar, and a spring located intermediate said two adjustment means and the inactive surface of said tool.

References Cited

UNITED STATES PATENTS

| | | | |
|---|---|---|---|
| 1,618,604 | 2/1927 | Riggs | 29—80 |
| 1,659,765 | 2/1928 | Cantebury | 29—80 |
| 2,643,442 | 6/1953 | Tury | 29—80 |
| 2,833,025 | 5/1958 | Crawford | 29—80 |

HARRISON L. HINSON, Primary Examiner

U.S. Cl. X.R.

29—80